UNITED STATES PATENT OFFICE 2,688,023

5-(3-CYANOPROPYL) HYDANTOIN AND ITS PREPARATION AND USE TO PREPARE 5-(4-AMINOBUTYL) HYDANTOIN

Arthur O. Rogers, Lewiston, N. Y., assignor to E. I. du Pont de Nemours and Company, Wilmington, Del., a corporation of Delaware No Drawing. Application June 27, 1952,
Serial No. 296,092

4 Claims. (Cl. 260—309.5)

This invention relates to 5-(3-cyanopropyl) hydantoin, its preparation and its use in preparing 5-(4-aminobutyl) hydantoin which is a valuable lysine intermediate.

It is an object of the invention to provide a method for preparing 5-(3-cyanopropyl) hydantoin, a new compound having the structural formula:

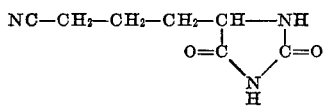

Another object is to provide a method for preparing the above compound in which 4-cyanobutyraldehyde is employed as a starting material. Another object is to provide a new method for preparing 5-(4-aminobutyl) hydantoin starting from 4-cyanobutyraldehyde and involving the intermediate formation of 5-(3-cyanopropyl) hydantoin. Still further objects will be apparent from the following description.

The above objects are accomplished in accordance with the invention by the production of 5-(3-cyanopropyl) hydantoin, particularly by reacting in an aqueous reaction medium 4-cyanobutyraldehyde, a compound yielding carbonate ions, a compound yielding ammonium ions and a compound yielding cyanide ions; and hydrogenating the 5-(3-cyanopropyl hydantoin to obtain 5-(4-aminobutyl) hydantoin. The latter compound can be readily hydrolyzed by well-known methods to yield lysine.

The reaction to produce 5-(3-cyanopropyl) hydantoin is preferably carried out at an elevated temperature, e. g., in the range of about 50 to 80° C., for about 1 hour to several hours, after which 5-(3-cyanopropyl) hydantoin is separated from the reaction mixture by usual methods, e. g. by crystallization. At temperatures below about 40° C. the reaction is slow. Temperatures above 80° C., e. g. up to 100° C. or higher, can be employed but appear to offer no added advantages.

The above reaction should be carried out in an aqueous reaction medium, which medium may, however, contain relatively large amounts of a solvent other than water. Generally, the water content of the medium should be at least 30% by weight; preferably it will be 50 to 100%. The reaction medium can include a substantial amount of an alcohol, e. g. ethanol, propanol, butanol or ethylene glycol. Other non-aqueous solvents which are inert to the reactants and to the product can also be used. The reaction medium such as water or a water-alcohol solution will generally be employed in the proportion of at least 4 parts for each part by weight of 4-cyanobutyraldehyde being reacted. Preferably 10 to 25 parts of the former will be employed for each part of the latter, but much larger amounts of the reaction medium can be used if desired.

By compounds yielding cyanide ions, carbonate ions or ammonium ions is meant any compound which when added to the reaction medium will yield therein a substantial concentration of cyanide ions, carbonate ions or ammonium ions. Hydrocyanic acid, alkali metal and alkaline earth metal cyanides and ammonium cyanide are examples of compounds which yield cyanide ions. Ammonium carbonate, or ammonia and carbon dioxide, are illustrative of compounds yielding both carbonate and ammonium ions. Other compounds yielding one or both of these ions are ammonium chloride, ammonium carbamate and sodium carbonate.

Sodium and hydrogen cyanides are the preferred compounds yielding cyanide ions while ammonium carbonate, or ammonia and carbon dioxide are preferred as compounds yielding carbonate and ammonium ions. The above compounds are generally preferred because they are readily available at low cost and give good results.

The reaction to produce 5-(3-cyanopropyl) hydantoin is preferably carried out under alkaline conditions, such as those obtaining when sodium cyanide and ammonium carbonate are employed as reactants. However, neutral or slightly acidic conditions can be effectively employed. The reaction may be carried out employing a substantial excess of any of the individual reactants but an excess of 4-cyanobutyraldehyde will generally be avoided. Suitable proportions of the reactants are 1 to 2.5 moles of cyanide ions, 1 to 10.0 moles of carbonate ions and 1 to 15.0 moles of ammonium ions for each mole of 4-cyanobutyraldehyde. If desired, the aldehyde can first be reacted with hydrogen cyanide and the resulting aldehyde cyanohydrin can then be reacted with, for example, ammonium carbonate to obtain the desired 5-(3-cyanopropyl) hydantoin.

Reduction of the 5-(3-cyanopropyl) hydantoin to 5-(4-aminobutyl) hydantoin may be effected by the action of hydrogen at elevated temperatures in the presence of a hydrogenation catalyst. It is preferred to have present a relatively large quantity of ammonia, e. g., 5 to 10 moles, per mole of 5-(3-cyanopropyl) hydantoin, in order to suppress the formation of secondary and tertiary amines and to obtain as large a yield as possible of the desired primary amine. Anhydrous liquid ammonia itself may be used as solvent for the reaction but any inert solvent such as alcohol may be employed in addition to ammonia if desired. The preferred hydrogenation catalysts are metallic nickel or cobalt, which may be used with or without a support such as kieselguhr. The reaction may be carried out at a temperature in the range of about 100 to 200° C., preferably at a pressure of about 1500 to 2000 p. s. i. Higher pressures can be used.

The following examples, in which parts are by weight unless stated otherwise, illustrate the invention.

Example 1

Ten parts of 4-cyanobutyraldehyde dimethyl acetal are added during 10 minutes to 70 parts of water containing 5 parts (by volume) of concentrated hydrochloric acid. The resulting solution is heated on a steam bath for 30 minutes, cooled to room temperature, then neutralized with sodium carbonate. The resulting solution of 4-cyanobutyraldehyde is placed in a reaction flask provided with a mechanical stirrer, a reflux condenser and a thermometer. There are then added to the flask 31.8 parts of ammonium carbonate, 6.85 parts of sodium cyanide and 70 parts of water. After stirring the resulting mixture at 58–60° C. for 2 hours, it is rendered slightly acidic by the addition of concentrated hydrochloric acid and then heated at 60–65° C. for an additional 15 minutes. This heating treatment improves product purity and yield. The mixture is concentrated under reduced pressure to about one-half its original volume, then cooled to precipitate 5-(3-cyanopropyl) hydantoin. The latter is recrystallized from hot water to give 5.7 parts of 5-(3-cyanopropyl) hydantoin melting at 154.5–159.0° C. This amount corresponds to a 48.7% yield based on the 4-cyanobutyraldehyde dimethyl acetal.

Example 2

Fifty parts by volume of aqueous ethanol containing equal parts by weight of ethanol and water, are added to a reaction flask equipped as described in Example 1. Also added to the flask are 1.94 parts of 4-cyanobutyraldehyde, 2.6 parts of potassium cyanide and 9.1 parts of ammonium carbonate. The mixture is stirred and heated for 2 hours at 59–60° C., then acidified slightly with hydrochloric acid and heated a further 15 minutes at 60–65° C. The reaction mixture is reduced in volume as described in Example 1 and the precipitated product, after recrystallization from aqueous alcohol gives 5-(3-cyanopropyl) hydantoin having a melting point of 157.5–160.0° C. Analyses: C, 50.17%; H, 5.16%; N, 23.81%. Calculated for $C_7H_9O_2N_3$: C, 50.30%; H, 5.39%; N, 25.15%.

Example 3

One hundred sixty-seven parts of 5-(3-cyanopropyl) hydantoin, ten parts of Raney nickel catalyst and 100 parts of liquid ammonia are charged into a hydrogenation bomb which has been cooled in a Dry Ice bath. The bomb is fitted with a thermocouple, a pressure gauge and a tube for adding hydrogen under pressure. Hydrogen is introduced into the bomb to raise the pressure to about 1500 p. s. i. The temperature is raised to 140 to 150° C. and the pressure is maintained at 1500 to 2000 p. s. i. by periodic additions of hydrogen until no further absorption of hydrogen occurs. The bomb is then cooled to room temperature and the pressure is released. After most of the ammonia has evaporated, alcohol (200 parts) is added and the contents of the bomb are removed and filtered. Evaporation of the filtrate leaves a residue of crude 5-(4-aminobutyl) hydantoin which is suitable for hydrolysis to lysine without purification. The crude product can be purified by known methods if desired. Thus, it can be converted to its hydrochloride which can be precipitated in relatively pure form from a solution in alcohol by the addition of a liquid non-solvent such as ether. Such purification is generally not necessary when conversion to lysine is the objective.

The 4-cyanobutyraldehyde used to prepare the 5-(3-cyanopropyl) hydantoin can be obtained by the method of Example 12 of U. S. Patent 2,437,600.

The new compound, 5-(3-cyanopropyl) hydantoin is a useful chemical intermediate. It can be hydrogenated to obtain 5-(4-aminobutyl) hydantoin, which by hydrolysis with aqueous solutions of strong acids or bases, yields valuable lysine. This 5-(3-cyanopropyl) hydantoin may also be chlorinated in aqueous alkaline media to obtain the corresponding 1,3-dichloro derivative having useful oxidizing and germicidal properties.

I claim:

1. The method of preparing 5-(4-aminobutyl) hydantoin comprising reacting in an aqueous medium at a temperature within the range of 40 to 100° C. 4-cyanobutyraldehyde, a compound yielding cyanide ions, a compound yielding carbonate ions and a compound yielding ammonium ions; and hydrogenating the resulting 5-(3-cyanopropyl) hydantoin in the presence of a hydrogenation catalyst from the group consisting of metallic nickel and cobalt at a temperature within the range of 100 to 200° C. and at a pressure of at least 1500 p. s. i.

2. The method of preparing 5-(3-cyanopropyl) hydantoin comprising reacting in an aqueous medium 4-cyanobutyraldehyde, a compound yielding cyanide ions, a compound yielding carbonate ions and a compound yielding ammonium ions.

3. The method of claim 2 wherein the reaction is carried out at a temperature within the range of 40 to 100° C.

4. 5-(3-cyanopropyl) hydantoin.

References Cited in the file of this patent

UNITED STATES PATENTS

| Number | Name | Date |
|---|---|---|
| 2,391,799 | Rogers | Dec. 25, 1945 |
| 2,532,047 | Wainer | Nov. 28, 1950 |
| 2,564,647 | Rogers | Aug. 14, 1951 |

OTHER REFERENCES

Degering, "An Outline of Organic Nitrogen Compounds," University Lithoprinters, 1945, pp. 508–509.